Patented Mar. 13, 1923.

1,448,276

UNITED STATES PATENT OFFICE.

MAX LANDAU, OF BERLIN, GERMANY, ASSIGNOR, BY MESNE ASSIGNMENTS, TO THE CHEMICAL FOUNDATION, INC., A CORPORATION OF DELAWARE.

COMPOSITION OF MATTER AND METHOD FOR PRESERVING ORGANIC POROUS MATERIALS.

No Drawing. Application filed May 9, 1917. Serial No. 167,564.

*To all whom it may concern:*

Be it known that I, MAX LANDAU, a subject of the King of Prussia and the German Emperor, residing at 29 Bayerischestreet, Berlin, Kingdom of Prussia, German Empire, have invented a new and useful Improvement in Compositions of Matter and Methods for Preserving Organic Porous Materials (for which an application was filed in Germany October 23, 1916, G. 44,-523); and I do hereby declare the following to be a full, clear, and exact description of the same.

My invention refers to a new composition of matter and a new method for preserving organic porous materials, such as textile fabrics, paper, wood, cork and the like.

My process consists in introducing compounds containing the fluorine sulfoacid radical (the fluosulfonic group $SO_3F$) into the porous materials. I have found that all compounds containing the fluosulfonic acid group $SO_3F$ which are liquid, which are soluble in any solvent, and which may be mixed with a solvent in the form of an emulsion by means of a suitable emulsifying agent, as soaps, albumenoid substances, (glue, casein), may be satisfactorily used in accordance with my invention as, for example, free fluosulfonic acid $HSO_3F$ and its salts with the alkali metals, alkaline earth metals, heavy metals, and organic bases. Among the salts which may be employed in my process are the salts of lithium, potassium, sodium, ammonium, zinc, aniline, pyridine, quinoline, betaine, and hexamethylentetramine.

I may employ fluosulfonic acid $HSO_3F$ by itself or a solution or emulsion in suitable solvents such as tar oils, alcohol and acetone. For instance I may use a solution of 1.5 grams $HSO_3F$ in 100 grams of tar oils. I may use solutions of the alkali salts, especially of lithium or sodium in water or in suitable organic solvents, as tar oils, alcohol and acetone. I may use mixtures of the said alkali salts, for instance a mixture of the lithium and the sodium salt. I may use solutions or emulsions of the heavy metal salts of fluosulfonic acid in a suitable solvent. Of the salts of the heavy metals especially the zinc salt is very suitable because it gives clear aqueous solutions without deposition of basic compounds. Instead of solutions I may also use emulsions of the salts with water, soaps and tar oils. I may use a single heavy metal salt or a mixture of several heavy metal fluosulfonates, or an admixture of heavy metal salts with alkali metal fluosulfonates. The introduction of the salts into the porous materials may also be carried out by introducing first the free acid and then the base or firstly the base and then the free acid. The introduction of the heavy metal salts may be carried out by introducing mixtures of the alkali metal fluosulfonates with any metal salts capable of reacting with the alkali metal fluosulfonates with formation of the fluosulfonates of the heavy metals or combinations of the same with the alkali metal salts. For instance I may use sodium-fluosulfonate and chloride of zinc, which I introduce separately in solution or in mixtures. I may also use mixtures of the salts with other soluble salts, having either a preserving or a fireproofing or an indifferent action. For instance I may use additions of ammonium sulfate, ammonium fluoride, sodium sulfate, sodium fluoride, sodium chloride, and borax.

For introducing the said compositions into the porous materials I may immerse the materials into the said solutions or emulsions and allow to remain a suitable period in the said solutions or emulsions. Or I may bring the solutions or emulsions on the surface of the material, for instance wood. I may also subject the material to be preserved to a vacuum or a lower pressure than atmospheric and introduce the solutions or emulsions, preferably of 80–90 degrees centigrade, under higher than atmospheric pressure into the material. I may also introduce a certain amount of liquid containing the fluosulfonic compounds insufficient for impregnating the porous materials completely and subject the materials to a high pressure, by means of gas, liquid, or vapors in order to spread the liquid containing the fluosulfonic compounds throughout the porous material.

I may use a solution of the fluosulfonic compounds containing 1.5 per cent. I may however use a higher or smaller amount.

The new composition of matter for carrying out my process contains fluosulfonic acid $HSO_3F$ or salts of the same. The composition contains the free fluosulfonic acid or its salts with the alkali metals, alkaline earth metals, heavy metals and organic bases. Suitable salts for the purpose of the present invention are for instance, the salts of lithium, potassium, sodium, ammonium, zinc, aniline, pyridine, quinoline, betaine and hexamethylentetramin. The composition may contain the salts in the pure state, or in the impure state, for instance the composition may contain a mixture of fluosulfonic acid with the bases, such as sodium hydroxide and the bases derived from tar. The composition may contain mixtures of the alkali salts of the fluosulfonic acid with salts of the heavy metals, for instance chlorides or sulfates or carbonates capable of reacting with the said alkali salts to form the fluosulfonates of the heavy metals. A suitable composition contains the sodium fluosulfonate mixed with chloride of zinc. The composition may contain also other salts which have a fireproofing action, for instance sodium sulfate, ammonium sulfate, sodium chloride and borax or which are indifferent in which latter case they act as diluents. The composition may contain the said substances in solid form, in the state of a simple mixture or in compressed state, in the form of tablets. The composition may also contain the substances in a liquid state, for instance the free fluosulfonic acid, and as a solution of the substances in inorganic or organic solvents, for instance in water, alcohol, acetone, or tar oils, as far as the substances may be utilized in such solvents.

I claim—

1. The process for preserving porous organic materials which comprises introducing compounds containing the fluosulfonic acid group $SO_3F$ into the materials.

2. The process for preserving porous organic materials which comprises introducing salts of the fluosulfonic acid into materials.

3. The process for preserving porous organic materials, which consists in introducing thereinto salts of fluosulfonic acid and water soluble salts of mineral acids.

4. A composition of matter suitable for the preservation of porous organic materials, consisting of an intimate mixture of a compound containing the fluosulfonic acid group with the salt of a mineral acid.

5. A composition of matter suitable for the preservation of porous organic materials, consisting of an intimate mixture of a compound containing the fluosulfonic acid group with a water soluble salt of a mineral acid.

6. A composition of matter suitable for the preservation of porous organic materials, consisting of an intimate mixture of a compound containing the fluosulfonic acid group with a water soluble zinc salt.

7. A composition of matter suitable for the preservation of porous organic materials, consisting of an intimate mixture of a compound containing the fluosulfonic acid group with a zinc chloride.

8. A composition for preserving porous organic materials, consisting of an intimate mixture of salts of fluosulfonic acid and water soluble salts of mineral acids.

9. A composition of matter suitable for the preservation of porous organic materials, having as an ingredient a compound containing the fluosulfonic acid group.

In testimony whereof, I have signed my name to this specification in the presence of two subscribing witnesses.

MAX LANDAU.

Witnesses:
HENRY HASPER,
ALLEN F. YOUNGS.